US010885598B2

(12) United States Patent
Parrish et al.

(10) Patent No.: US 10,885,598 B2
(45) Date of Patent: Jan. 5, 2021

(54) APPARATUS, SYSTEM, AND METHOD SUPPORTING COMPLIANCE WITH CUSTOMS/BORDER REQUIREMENTS

(71) Applicant: Dallas/Fort Worth International Airport Board, Dallas, TX (US)

(72) Inventors: John M. Parrish, Fort Worth, TX (US); Kelly C. Tuggle, North Richland Hills, TX (US); Jason Stauty, Flower Mound, TX (US)

(73) Assignee: DALLAS/FORT WORTH INTERNATIONAL AIRPORT, Dallas, TX (US)

( * ) Notice: Subject to any disclaimer, the term of this patent is extended or adjusted under 35 U.S.C. 154(b) by 1230 days.

(21) Appl. No.: 14/491,496

(22) Filed: Sep. 19, 2014

(65) Prior Publication Data

US 2015/0088776 A1    Mar. 26, 2015

Related U.S. Application Data

(60) Provisional application No. 61/880,671, filed on Sep. 20, 2013.

(51) Int. Cl.
*G06Q 50/26* (2012.01)
*G06Q 10/00* (2012.01)

(52) U.S. Cl.
CPC .......... *G06Q 50/265* (2013.01); *G06Q 10/00* (2013.01)

(58) Field of Classification Search
CPC ... H04L 63/1416; G06Q 50/265; G06Q 10/00
See application file for complete search history.

(56) References Cited

U.S. PATENT DOCUMENTS

| 6,085,976 A | 7/2000 | Sehr |
| 6,786,401 B2 | 9/2004 | Kimoto et al. |
(Continued)

FOREIGN PATENT DOCUMENTS

WO    WO 2008/097335 A2    8/2008

OTHER PUBLICATIONS

International Search Report dated Dec. 30, 2014 in connection with International Patent Application No. PCT/US2014/056482, 4 pages.
(Continued)

*Primary Examiner* — Minnah L Seoh
*Assistant Examiner* — Wenren Chen

(57) ABSTRACT

A system includes a kiosk configured to collect information associated with a traveler. The information includes information from a passport of the traveler, a photograph of the traveler, and travel-related information associated with the traveler. The system also includes a camera configured to obtain an image of the traveler approaching or within a specified portion of a customs/border enforcement area. The system further includes at least one computing device configured to receive the information from the kiosk, provide at least a portion of the information to an external system, and receive a disposition code from the external system. The disposition code identifies whether the traveler is allowed to pass the customs/border enforcement area. The at least one computing device is also configured to receive the image, perform facial recognition to identify the traveler, and provide at least some of the information to an agent associated with the customs/border enforcement area.

20 Claims, 10 Drawing Sheets

(56) References Cited

U.S. PATENT DOCUMENTS

| | | | |
|---|---|---|---|
| 2002/0169692 A1 | 11/2002 | Dutta et al. | |
| 2002/0198731 A1 | 12/2002 | Barnes et al. | |
| 2004/0078335 A1 | 4/2004 | Calvesio et al. | |
| 2004/0172364 A1 | 9/2004 | Murray et al. | |
| 2007/0158418 A1 | 7/2007 | Weekes | |
| 2009/0322866 A1* | 12/2009 | Stotz | G07C 9/257 348/77 |
| 2010/0051679 A1 | 3/2010 | Molloy et al. | |
| 2012/0203827 A1* | 8/2012 | Casey | G06Q 10/0831 709/203 |
| 2012/0210387 A1* | 8/2012 | Sampigethaya | H04L 63/104 726/1 |
| 2013/0027187 A1 | 1/2013 | Yepez | |
| 2013/0070974 A1 | 3/2013 | Stefani | |
| 2014/0070946 A1* | 3/2014 | Ambrefe, Jr. | G06F 3/0482 340/541 |
| 2014/0279648 A1* | 9/2014 | Whitehouse | G06Q 10/083 705/330 |
| 2015/0088778 A1* | 3/2015 | Tsao | G06Q 50/265 705/325 |
| 2016/0078581 A1* | 3/2016 | Maher | G06F 16/83 705/325 |

OTHER PUBLICATIONS

Written Opinion of International Searching Authority dated Dec. 30, 2014 in connection with International Patent Application No. PCT/US2014/056482, 4 pages.

\* cited by examiner

APPARATUS, SYSTEM, AND METHOD SUPPORTING COMPLIANCE WITH CUSTOMS/BORDER REQUIREMENTS

CROSS-REFERENCE TO RELATED APPLICATION AND PRIORITY CLAIM

This application claims priority under 35 U.S.C. § 119(e) to U.S. Provisional Patent Application No. 61/880,671 filed on Sep. 20, 2013. This provisional patent application is hereby incorporated by reference in its entirety.

TECHNICAL FIELD

This disclosure relates generally to customs/border compliance. More specifically, this disclosure relates to an apparatus, system, and method supporting compliance with customs/border requirements.

BACKGROUND

Many countries typically require visitors or returning citizens or residents to clear customs/border checkpoints before entering those countries. Among other things, enforcement officers at customs/border checkpoints can verify that people attempting to enter a specific country are legally allowed entry and are complying with various local laws. The enforcement officers may also attempt to identify whether people trying to enter a specific country are a security threat. In some locations, customs/border checkpoints can become very crowded. For instance, the customs/border checkpoints at a busy international airport can easily become overwhelmed by a large number of arriving passengers. This can lead to long lines and excessive wait times at the customs/border checkpoints.

SUMMARY

This disclosure provides an apparatus, system, and method supporting compliance with customs/border requirements.

In a first embodiment, a system includes a kiosk configured to collect information associated with a traveler. The information includes information from a passport of the traveler, a photograph of the traveler, and travel-related information associated with the traveler. The system also includes a camera configured to obtain an image of the traveler approaching or within a specified portion of a customs/border enforcement area. The system further includes at least one computing device configured to receive the collected information from the kiosk, provide at least a portion of the collected information to an external system, and receive a disposition code from the external system. The disposition code identifies whether the traveler is allowed to pass the customs/border enforcement area. The at least one computing device is also configured to receive the image, perform facial recognition to identify the traveler, and provide at least some of the collected information to an agent associated with the customs/border enforcement area.

In a second embodiment, an apparatus includes at least one memory configured to store information associated with a traveler. The information includes information from a passport of the traveler, a photograph of the traveler, and travel-related information associated with the traveler. The apparatus also includes at least one interface configured to receive an image of the traveler approaching or within a specified portion of a customs/border enforcement area. The apparatus further includes at least one processing device configured to provide at least a portion of the information to an external system and receive a disposition code from the external system. The disposition code identifies whether the traveler is allowed to pass the customs/border enforcement area. The at least one processing device is also configured to receive the image, perform facial recognition to identify the traveler, and provide at least some of the information to an agent associated with the customs/border enforcement area.

In a third embodiment, a method includes receiving information associated with a traveler. The information includes information from a passport of the traveler, a photograph of the traveler, and travel-related information associated with the traveler. The method also includes receiving an image of the traveler approaching or within a specified portion of a customs/border enforcement area. The method further includes providing at least a portion of the information to an external system and receiving a disposition code from the external system. The disposition code identifies whether the traveler is allowed to pass the customs/border enforcement area. In addition, the method includes performing facial recognition using the image to identify the traveler and providing at least some of the information to an agent associated with the customs/border enforcement area.

In a fourth embodiment, a non-transitory computer readable medium embodies a computer program. The computer program includes computer readable program code for receiving information associated with a traveler. The information includes information from a passport of the traveler, a photograph of the traveler, and travel-related information associated with the traveler. The computer program also includes computer readable program code for receiving an image of the traveler approaching or within a specified portion of a customs/border enforcement area. The computer program further includes computer readable program code for providing at least a portion of the information to an external system and receiving a disposition code from the external system. The disposition code identifies whether the traveler is allowed to pass the customs/border enforcement area. In addition, the computer program includes computer readable program code for performing facial recognition using the image to identify the traveler and providing at least some of the information to an agent associated with the customs/border enforcement area.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 12B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
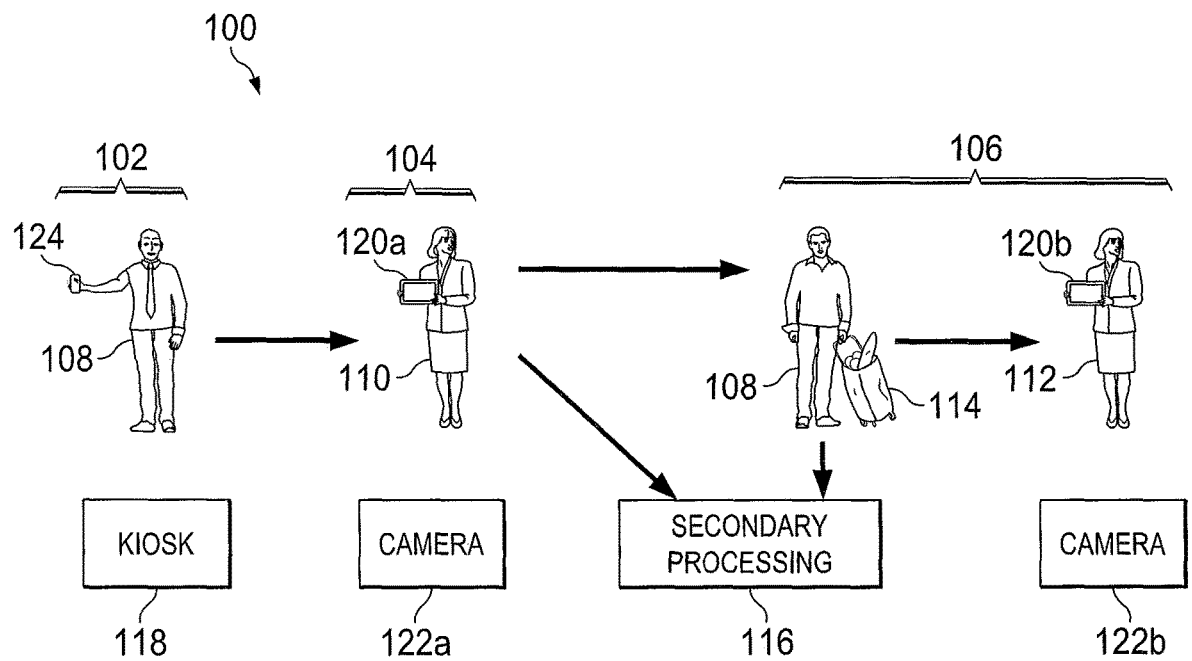
FIG. 1 illustrates an example customs/border enforcement scheme at an airport or other location according to this disclosure.

FIG. 1 illustrates an example customs/border enforcement scheme 100 at an airport or other location according to this disclosure. As shown in FIG. 1, the customs/border enforcement scheme 100 is generally divided into three stages 102-106. The first stage 102 denotes an initial contact point where a traveler 108 provides information for customs or border enforcement purposes. The second stage 104 denotes a disposition area where customs/border personnel 110 make an initial assessment of whether the traveler 108 is allowed to pass. Often times, the customs/border personnel 110 in the disposition area perform an initial review of the traveler's information and indicate whether the traveler 108 is allowed to proceed, such as to a baggage claim area. The third stage 106 denotes an egress area where additional customs/border personnel 112 make a final assessment of whether the traveler 108 (with his or her luggage 114) is allowed to pass.

At any point within this process, the traveler 108 (with or without his or her luggage 114) can be directed to a secondary processing area 116. The secondary processing area 116 generally denotes an area where additional screening of travelers occurs. The additional screening could take various forms, such as searches of luggage or travelers, chemical residue tests, in-person interviews, and the like.

As shown in FIG. 1, to help speed up the customs/border enforcement process, the traveler 108 here interacts with a kiosk 118 in the first stage 102. The kiosk 118 represents an electronic system that can be used by travelers wishing to pass through a customs or border checkpoint. As described in more detail below, the kiosk 118 can be used to scan a traveler's passport and collect or verify information about the traveler. Any suitable mechanism(s) could be used to scan a traveler's passport, such as a "machine readable zone" (MRZ) optical scanner or a radio frequency identification (RFID) reader.

The information about the traveler could include travel information, such as the airline flight on which the traveler arrived. The information about the traveler could also include biometric information, such as fingerprints or retinal scans. The information about the traveler could further include the traveler's answers to various questions asked in customs/border declaration forms. Example declarations can include a declaration whether the traveler is carrying currency or monetary instruments in excess of a threshold amount and a declaration whether the traveler is complying with "duty free" exemptions. Other example declarations can include a declaration whether the traveler is bringing food, plants, or animals into the country and a declaration whether the traveler had close contact with livestock while outside the country. In addition, the information about the traveler could include one or more photographs of the traveler. Any other or additional declarations or other information about the traveler can be collected by the kiosk 118.

Depending on the implementation, various operations could occur using the kiosk 118. For example, in some embodiments, the kiosk 118 could print a paper receipt or other document that is provided to the traveler 108 after verifying the traveler's passport and collecting/verifying information about the traveler 108. The traveler 108 could present this receipt to the customs/border personnel 110, who could use a code or other information on the receipt to direct the traveler 108 to a baggage claim area, an egress area, or a secondary processing area 116. The traveler 108 could also present the receipt to the customs/border personnel 112 controlling exit from the overall customs/border enforcement area.

In other embodiments, various customs/border personnel 110-112 could carry or otherwise use various devices 120a-120b (such as portable MRZ/RFID/other scanners or tablet/laptop/desktop/other computers with scanning/imaging capabilities) to scan travelers' passports as the travelers 108 move. The devices 120a-120b could also retrieve the travelers' information and provide the customs/border personnel 110-112 with indications whether the travelers 108 are allowed to proceed or need to go through secondary processing. In these embodiments, the kiosk 118 need not provide printed receipts to the travelers 108, making this effectively a "paperless" process.

In still other embodiments, the kiosk 118 includes a camera that captures one or more images of a traveler 108. As the traveler 108 moves between areas in the customs/border enforcement area, one or more cameras 122a-122b capture images of the traveler 108. Alternatively, the customs/border personnel 110-112 could use the devices 120a-120b to capture images of the traveler 108 as the traveler 108 approaches the personnel. Facial recognition could be used to identify the traveler 108 and display that traveler's information on the appropriate devices 120a-120b as the traveler 108 approaches or after the traveler 108 has arrived at particular locations. Again, in these embodiments, the kiosk 118 need not provide printed receipts to travelers 108, making this effectively a "paperless" process. Moreover, travelers 108 may not need to use their passports again after leaving the kiosk 118.

Note that use of or interaction with a kiosk 118 is optional and that other approaches could also be used to collect information from travelers. For example, as described below, a traveler 108 could use his or her portable device 124 (such as a mobile telephone, smartphone, personal digital assistant, laptop computer, wrist computer, or tablet computer) to capture an image of the traveler 108 and collect information from the traveler 108. The portable device 124 could then relay that information to a customs/border enforcement system for use by personnel 110-112.

Also note that the kiosk 118 could be used in various ways by different types of travelers 108. For example, in the United States, a kiosk 118 could provide information about U.S. citizens and legal permanent residents to a government agency, such as the U.S. Customs and Border Protection (CBP) agency. The kiosk 118 could then receive indications whether travelers are allowed to proceed to egress points or need to undergo secondary processing. That information can be provided to personnel 110-112 via printed receipts, electronic notifications, or other mechanisms.

However, other travelers (such as foreign visitors) may be required to undergo secondary processing at all times, and the kiosk 118 could collect information from those travelers and provide that information to personnel in the secondary processing areas 116. That information may or may not be provided to CBP or other government agency since there is no need to obtain an indication whether those travelers require secondary processing.

Additional details regarding example systems that support compliance with customs/border requirements are provided below. Additional details regarding example kiosks that support compliance with customs/border requirements are also provided below Although FIG. 1 illustrates one example of a customs/border enforcement scheme 100 at an airport or other location, various changes may be made to FIG. 1. For example, airports, train depots, bus depots, and other locations vary widely in size, scope, and layout. The scheme shown in FIG. 1 illustrates one possible way in which kiosks and other technology can be used to help simplify and speed up the customs/border enforcement processes.

FIGS. 2 through 7 illustrate example systems supporting compliance with customs/border requirements and related details according to this disclosure. In the following description, it is assumed that each system is used by arriving travelers attempting to enter a particular country via one or more airports. However, each system could be used in any other suitable location(s) and by any other suitable travelers.

Figure 2:
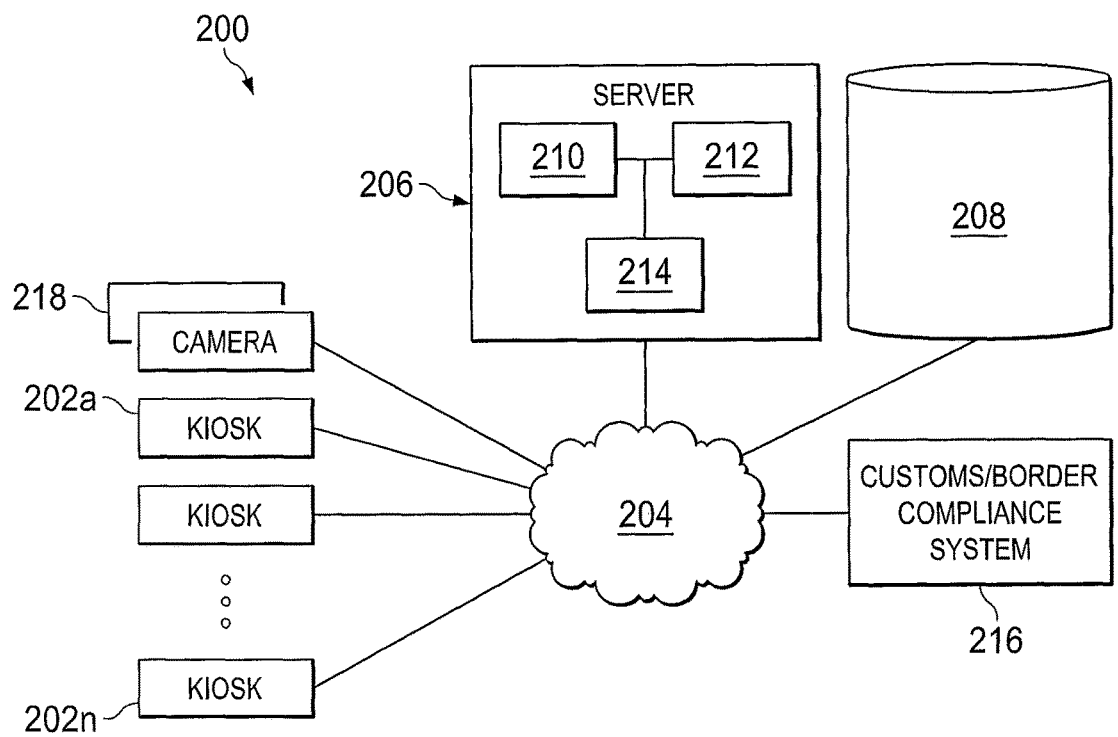
FIGS. 2 through 7 illustrate example systems supporting compliance with customs/border requirements and related details according to this disclosure.

As shown in FIG. 2, a system 200 includes multiple kiosks 202a-202n. The kiosks 202a-202n represent electronic systems that can be used by travelers wishing to pass through a customs/border checkpoint. As noted above, each kiosk 202a-202n can be used to scan travelers' passports and collect or verify information about the travelers. Each kiosk 202a-202n can also be used to collect desired or required customs/border declarations from the travelers. Each kiosk 202a-202n can further be used to capture each traveler's image and associate the image with that traveler's other data. In addition, each kiosk 202a-202n can optionally print receipts or other documents that can be provided by the travelers to customs/border enforcement officers, and/or each kiosk 202a-202n can provide the data directly to customs/border enforcement officers. Each kiosk 202a-202n includes any suitable structure for interacting with and collecting data from travelers. One example embodiment of the kiosks 202a-202n is described below.

The kiosks 202a-202n communicate over at least one network 204. Each network 204 facilitates communication between various components coupled to the network. For example, a network 204 may communicate Internet Protocol (IP) packets, frame relay frames, Asynchronous Transfer Mode (ATM) cells, or other suitable information between network addresses. The network(s) 204 may include one or more local area networks, metropolitan area networks, wide area networks, all or a portion of a global network, or any other communication system(s) at one or more locations.

At least one server 206 and at least one database 208 are used in the system 200 to support data collection for customs/border enforcement. For example, the database 208 can be used to store information collected by the kiosks 202a-202n. The server 206 can receive the information from the kiosks 202a-202n, store the information in the database 208, and optionally make the information available to external devices or systems (such as to CBP or other government agencies). The server 206 and the database 208 could also facilitate other activities, such as providing customs/border-related or non-customs/border-related information to travelers via the kiosks 202a-202n.

The server 206 includes any suitable computing device(s) supporting traveler data collection. In this example, the server 206 includes at least one processing device 210, such as at least one microprocessor, microcontroller, digital signal processor, field programmable gate array, application specific integrated circuit, discrete circuitry, or other processing or control device(s). The server 206 also includes at least one memory 212 for storing and facilitating retrieval of instructions and information used, generated, or collected by the processing device(s) 210. The server 206 further includes at least one network interface 214 configured to support communications over at least one network, such as a wired network interface (like an Ethernet interface) or a wireless network interface (like a radio frequency transceiver). Note that multiple servers 206 could be used to provide various functionality in the system 200. For instance, one or more application servers can be used to execute applications for traveler data collection, and one or more database servers can be used to control access to the database 208. The database 208 includes any suitable device(s) for storing and facilitating retrieval of information.

The system 200 could further include or interact with at least one customs/border compliance system 216. The customs/border compliance system 216 represents a system used by customs/border enforcement officers or other government officials or agencies. The customs/border compliance system 216 can receive the data collected or generated by the kiosks 202a-202n and/or the server 206, such as information identifying travelers and their related details. This data could be received directly or indirectly, such as via the database 208. The customs/border compliance system 216 can use this information in any suitable manner. For instance, the customs/border compliance system 216 could flag any traveler who provided or failed to provide certain declarations. The customs/border compliance system 216 could also perform image matching to verify that a traveler's recently-captured image or biometric data matches a preexisting picture or expected biometric data of the traveler. The customs/border compliance system 216 could further search alias, criminal, or terrorist databases with the traveler's name, image, or biometric data to determine if a match is found. The customs/border compliance system 216 could perform any other or additional functions as desired using information from the kiosks 202a-202n and/or server 206. In some embodiments, the customs/border compliance system 216 could be protected from unauthorized access, such as using a firewall. Also, communications to and from the compliance system 216 could occur using any suitable protocol(s), such as Simple Object Access Protocol (SOAP) or Hypertext Transfer Protocol Secure (HTTPS).

In some embodiments, the customs/border compliance system 216 could be responsible for deciding whether travelers are free to pass or require detention or secondary processing. Information from the kiosks 202a-202n about various travelers could be provided directly or indirectly to the customs/border compliance system 216, and the customs/border compliance system 216 can determine the disposition of the various travelers. Information identifying the decisions made by the customs/border compliance system 216 can be provided to the kiosks 202a-202n or to customs/border personnel (such as via the devices 120a-120b) for use in deciding how to handle the various travelers.

As noted above, however, interactions between the kiosks 202a-202n and the customs/border compliance system 216 need not occur in some situations. For example, the kiosks 202a-202n could be used to collect information from travelers who require secondary processing, and the kiosks 202a-202n could pass along the collected information to customs/border personnel without forwarding that information to or without waiting for decisions from the customs/border compliance system 216. As another example, the kiosks 202a-202n could detect questionable or fraudulent travel documents (such as fake or modified passports) and immediately alert customs/border personnel without transmitting information to the customs/border compliance system 216 or without waiting for a decision whether secondary processing is needed.

Various cameras 218 could also be used in the system 200 to facilitate functions such as security monitoring and facial recognition. As noted above, facial recognition can be used to identify travelers as the travelers move into different areas of a customs/border enforcement area. As a specific example, facial recognition can be used to identify a traveler and pull up that traveler's information on a display screen used by customs/border enforcement personnel without the need to rescan the traveler's passport.

Note that communications between various components (such as kiosks 202a-202n and the server 206 or compliance system 216) could occur using one or more secure communication protocols. For example, in particular embodiments, two components that are to communicate with one another can engage in two-way Secure Socket Layer (SSL) authentication.

Figure 3:
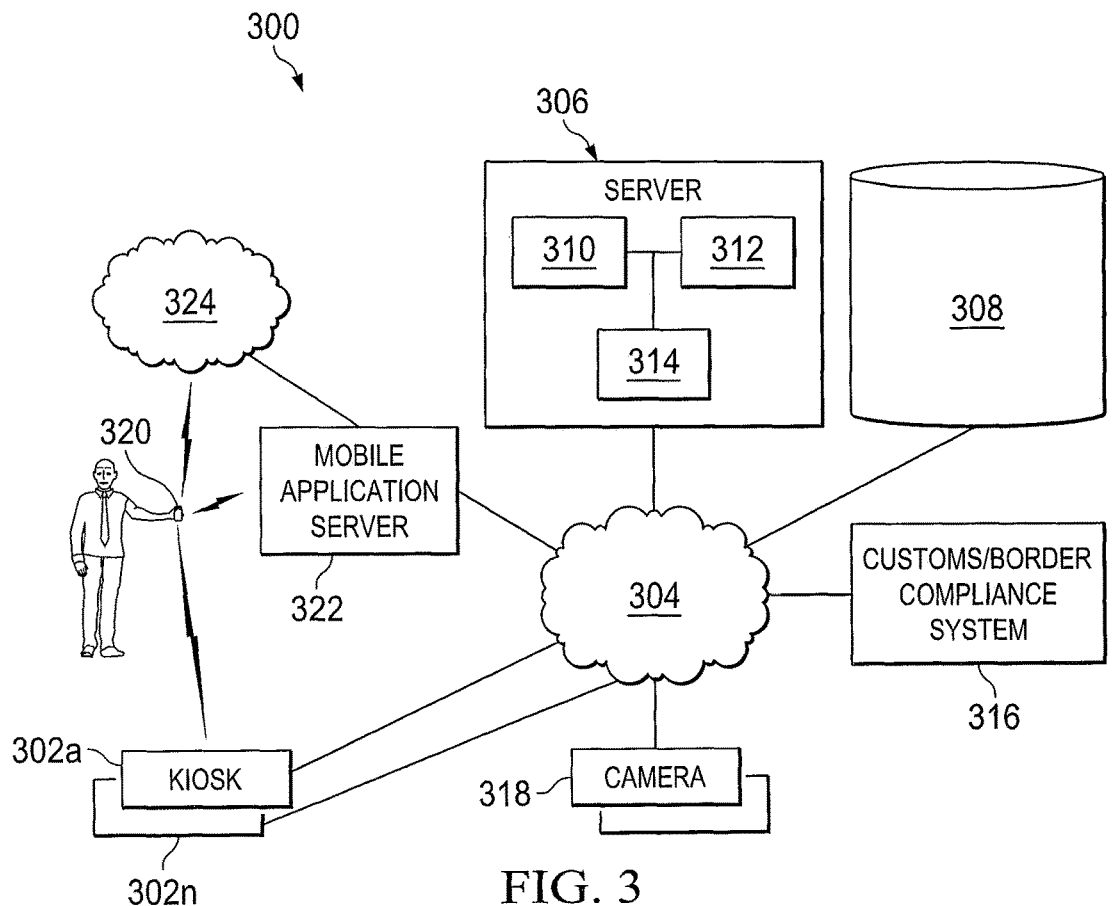

As shown in FIG. 3, a system 300 includes kiosks 302a-302n, at least one network 304, at least one server 306, and at least one database 308. The server 306 includes at least one processing device 310, at least one memory 312, and at least one network interface 314. The system 300 also includes at least one customs/border compliance system 316 and cameras 318. These components may be the same as or similar to corresponding components in FIG. 2.

Each kiosk 302a-302n in this example could interact with a traveler as described above. However, in this embodiment, a traveler's mobile device 320 can also be used to provide information to the system 300. The mobile device 320 represents any suitable portable computing device, such as a mobile telephone, smartphone, personal digital assistant, laptop computer, wrist computer, or tablet computer. The mobile device 320 could execute an "app" or other application that collects various information from the traveler, or the mobile device 320 could allow a traveler to access a website or other computing resource and provide information about the traveler for collection at a remote site.

The collected information could include information about the traveler, such as his or her name, address, and passport information. The collected information could also include travel information for the traveler, such as his or her flight information. The collected information could further include the traveler's answers for customs/border declarations. In addition, if equipped with a camera or biometric data collector, the collected information could include a photograph or biometric data of the traveler. For instance, some portable devices allow for the collection of one or more fingerprints from a user. This capability could be used to collect one or more fingerprint scans of a traveler.

The data collected using a mobile device 320 can be used in any suitable manner. In some embodiments, the data could remain stored on a mobile device 320 and then transmitted directly to a kiosk 302a-302n, such as when a traveler approaches the kiosk. This could be done, for instance, via infrared or WiFi communications between the mobile device 320 and the kiosk. This could also be done by pairing the mobile device 320 and the kiosk, such as via a BLUETOOTH connection. As particular examples, an app on the mobile device 320 could access wireless security credentials used for secure wireless communications with a kiosk. Alternatively, a display of the kiosk could present an alphanumeric code, QR code, or other code that can be manually entered into or scanned by the mobile device 320 to pair the devices or transfer information to the mobile device 320. Any other or additional mechanism(s) can be used to support data transfer directly between a mobile device 320 and a kiosk 302a-302n.

Data can also be transferred indirectly between the mobile device 320 and a kiosk. For example, the mobile device 320 could communicate with a mobile application server 322. These communications could occur directly or indirectly, such as via the network 304 or a third-party network 324 (like a cellular or other mobile telephone or data network). The mobile application server 322 can receive data from the mobile device 320, such as from an app executed by the mobile device 320. The mobile application server 322 can then provide the data to a kiosk being used by a traveler, to the server 306, and/or to the customs/border compliance system 316.

Note that in other implementations, a traveler using a mobile device 320 may be able to skip interacting with a kiosk 302a-302n completely, and no data may be sent from the mobile device 320 to a kiosk (directly or indirectly). For example, the traveler could provide all requested data, make all requested declarations, take a photograph of himself or herself, and take a photograph or otherwise scan his or her passport. The mobile device 320 could then make all of this information available to other components of the system 300, such as the server 306. In still other embodiments, a traveler using the mobile device 320 may be required to interact with a kiosk 302a-302n, such as to take a photograph or scan his or her passport. However, the traveler's time interacting with the kiosk can be significantly reduced when the traveler provides data via the mobile device 320 prior to approaching a kiosk.

Figure 4:
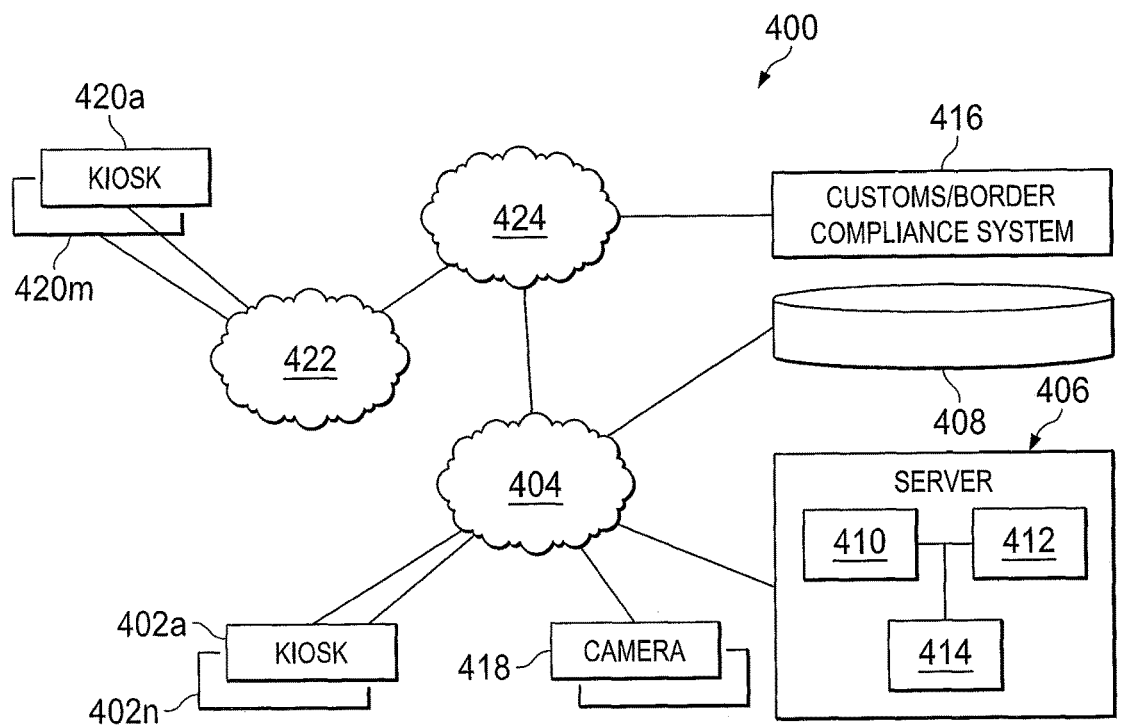

As shown in FIG. 4, a system 400 includes kiosks 402a-402n, at least one network 404, at least one server 406, and at least one database 308. The server 406 includes at least one processing device 410, at least one memory 412, and at least one network interface 414. The system 400 also includes at least one customs/border compliance system 416 and cameras 418. These components may be the same as or similar to corresponding components in FIGS. 2 and 3. The components 402-414, 418 could be used in a first location, such as a first airport.

The system 400 also includes multiple additional kiosks 420a-420m coupled to another network 422. The kiosks 420a-420m could be the same as or similar to the kiosks 402a-402n, and the network 422 represents any suitable network facilitating communications with the kiosks 420a-420m. The kiosks 420a-420m and the network 422 could be used in a second location, such as a distant part of the first airport or at a second airport (possibly separated from the first airport by a large distance). The networks 404 and 422 could communicate via a third network 424, which represents any suitable network or combination of networks. As a particular example, the third network 424 could represent a secure network, such as a cloud-based network compliant with suitable Federal Information Processing Standards (FIPS) requirements.

In this example, the server 406 handles (i) interactions between the kiosks 402a-402n and the customs/border compliance system 416 and (ii) interactions between the kiosks 420a-420m and the customs/border compliance system 416. The server 406 can be said to "host" the kiosks 420a-420m since the kiosks 420a-420m lack their own server or other gateway to a customs/border compliance system 416. The kiosks 420a-420m cannot interact directly with the customs/border compliance system 416 and instead access the compliance system 416 via the server 406. In this particular example, the customs/border compliance system 416 is coupled to the third network 424, although this need not be the case.

Figure 5:
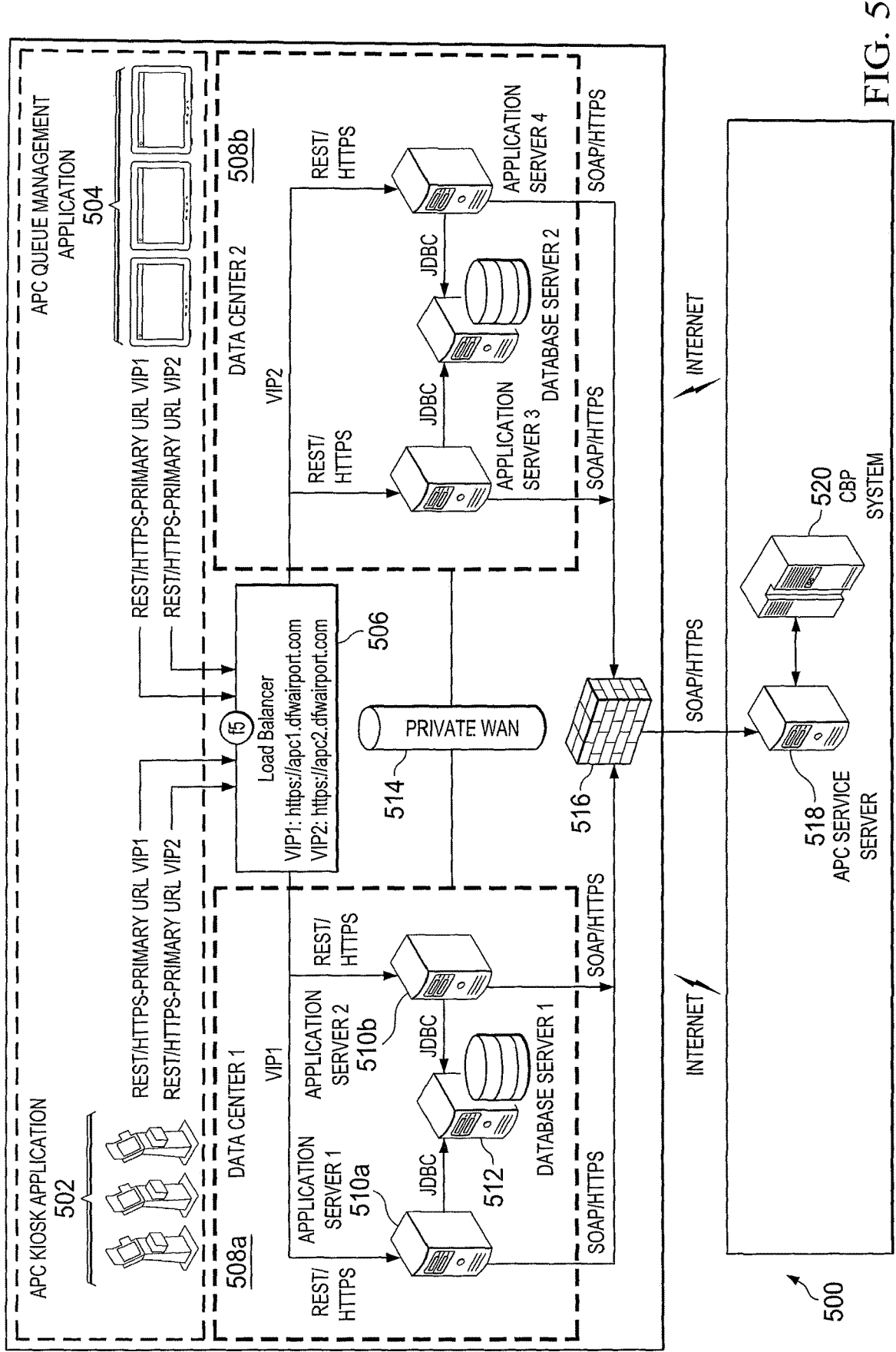

FIG. 5 illustrates a specific example implementation of a system 500 that supports customs/border enforcement. As shown in FIG. 5, the system 500 includes multiple kiosks 502, which could be located at one or more airport terminals or other locations. The kiosks 502 support automated passport control (APC). The system 500 also includes one or more APC queue managers 504, which denote laptop computers, tablet computers, display screens, or other devices used by customs/border enforcement personnel. For instance, information about travelers can be displayed on the queue managers 504 to facilitate disposition of the travelers.

These components 502-504 communicate with at least one load balancer 506, which distributes workload associated with the kiosks 502 and managers 504 amongst multiple data centers 508*a*-508*b*. Each data center 508*a*-508*b* includes multiple application servers 510*a*-510*b*, which could support operations such as traveler information collection and facial recognition. Each data center 508*a*-508*b* also includes at least one database server 512 that facilitates storage and retrieval of information.

At least one network 514 can be used to support communications amongst various components within the system 500. The network 514 could represent any suitable network, such as a private WAN. At least one firewall 516 controls access to the network 514, such as by requiring authentication before a user is allowed to access the network 514. Any suitable protocol(s) can be used to support communications amongst various components within the system 500. For instance, the kiosks 502 and managers 504 could communicate using Representational State Transfer (REST)/HTTPS, and the servers 510*a*-510*b* could communicate using SOAP/HTTPS. The servers 510*a*-510*b*, 512 could also communicate using JAVA Database Connectivity (JDBC).

Customs/border enforcement information is exchanged between the data centers 508*a*-508*b* and at least one APC service server 518, which provides access to at least one government agency's computer system (in this case, a CBP system 520). The APC service server 518 can perform various functions, such as authenticating the data centers 508*a*-508*b*, providing information to the CBP system 520 in a suitable format, and retrieving information from the CBP system 520 for delivery to the data centers 508*a*-508*b*.

Figure 6:
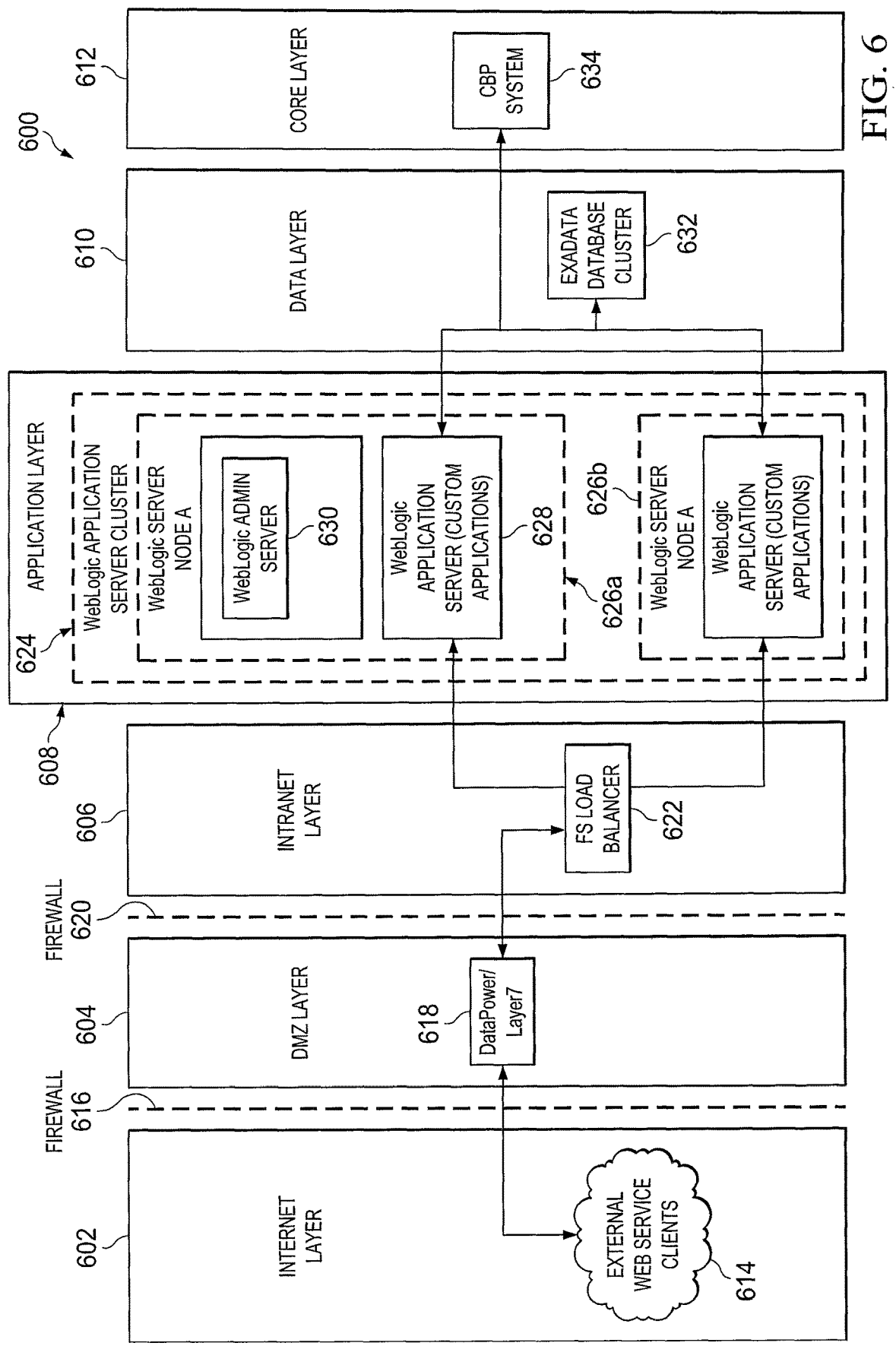

FIG. 6 illustrates an example technical architecture of a system 600 supporting compliance with customs/border requirements. In particular, FIG. 6 illustrates one possible example of isolating and mitigating security risks associated with attaching a non-government controlled system to a government network (such as a CBP network).

As shown in FIG. 6, the architecture here is generally divided into six layers 602-612. An Internet layer 602 generally denotes the layer in which various web service clients 614 (such as multiple kiosks) are hosted. A firewall 616 separates the Internet layer 602 from a demilitarized zone (DMZ) layer 604. The interface protocol between the Internet layer 602 and the DMZ 604 can be HTTPS/SOAP/XML messages sent to and from an XML appliance 618, such as a LAYER7 gateway. The XML appliance 618 can provide kiosks with a basic service access point to an APC service. The XML appliance 618 can be configured to prevent and control unauthorized access to servers and other services not available to systems outside the CBP network. Another firewall 620 separates the DMZ layer 604 from an Intranet layer 606, which includes a load balancer 622.

An application layer 608 can be implemented using at least one application server cluster 624, which is where the APC service can also reside. The APC service processes requests from kiosks and provides responses to the kiosks. The APC service also generates and processes CBP or other system messages and enforces business rules associated with an expedited CBP inspection. The APC service further ensures that message and dialogue timing requirements are met. The server cluster 624 here includes multiple application server nodes 626*a*-626*b*, each of which supports at least one application server 628 that executes one or more APC service applications. At least one administration server 630 can be used to control or oversee the entire application layer 608. A data layer 610 includes at least one database 632 that is accessible by the server cluster 624 and an external system 634 in a core layer 612. The external system 634 could represent a CBP or other government system.

Figure 7:
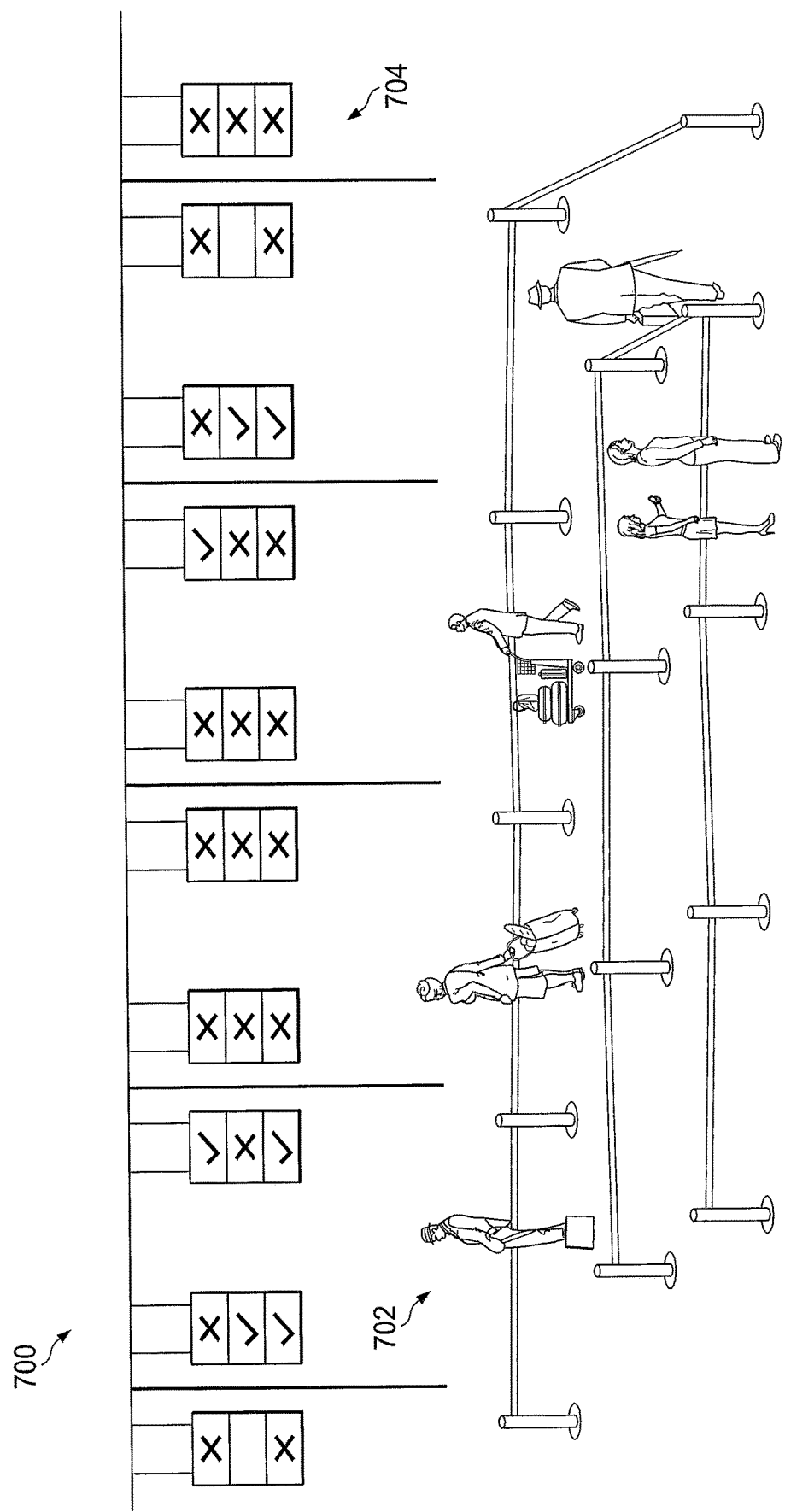

FIG. 7 illustrates an example system 700 in which travelers wait in one or more queues 702 to use various kiosks. Here, the kiosks are placed in groups of three, and each group of kiosks has an associated status display 704. Each status display 704 identifies the status of the three kiosks in its associated group. For example, a green display with a checkmark could indicate that a kiosk is operational and not currently in use by a traveler. A black display with an X could indicate that a kiosk is operational and currently in use by another traveler. A black display with a red horizontal line could indicate that a kiosk is not operational. Note, however, that any other suitable arrangement of kiosks and any suitable indicators identifying the statuses of the kiosks (or no status displays) could be used. As an example of an additional feature, each kiosk in a group could be identified with a label, such as a letter (like "A" through "C" or "D" through "F") or other alphanumeric identifier, and the status displays 704 could use the alphanumeric identifiers to identify the statuses of the kiosks.

Although FIGS. 2 through 7 illustrate examples of systems supporting compliance with customs/border requirements and related details, various changes may be made to FIGS. 2 through 7. For example, each system could include any number of each component. Also, FIGS. 2 through 7 illustrate various examples of the types of systems that can be used to support compliance with customs/border requirements. However, data collection and processing systems are highly flexible and reconfigurable, and this disclosure is not limited to the specific configurations shown here. In addition, the functional divisions shown in FIGS. 2 through 7 are for illustration only. Various components in each figure could be combined, further subdivided, or omitted and additional components could be added according to particular needs. Moreover, any combination of components shown in these figures could be used.

Figure 8:
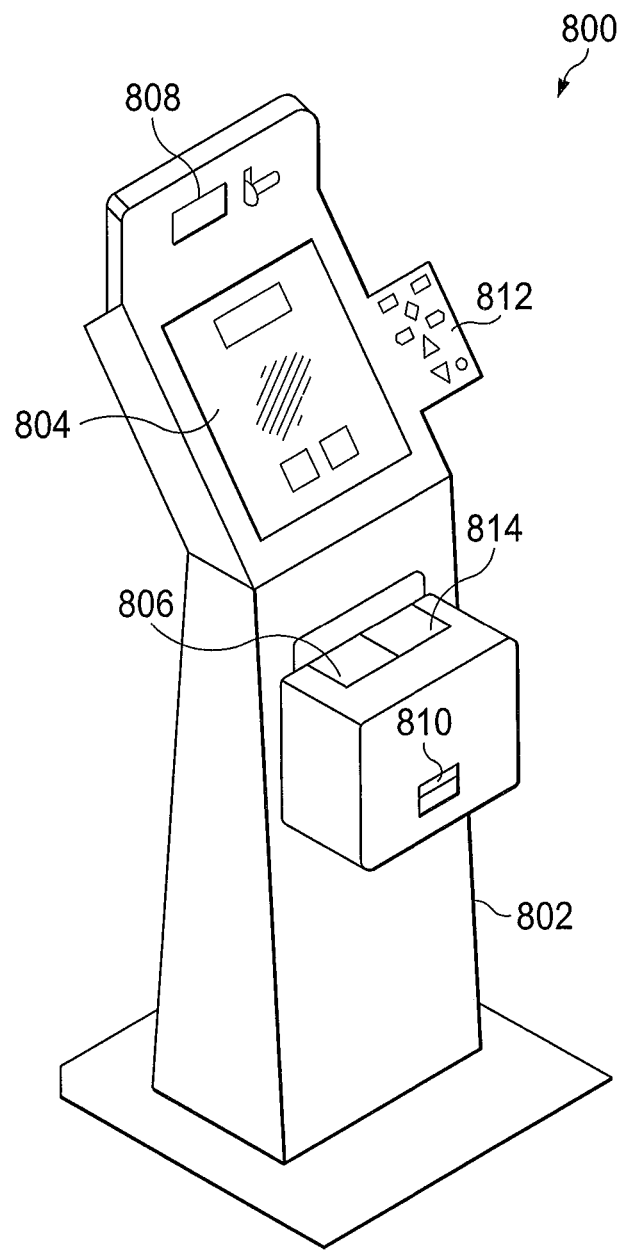
FIGS. 8 through 10 illustrate example kiosks and portable devices supporting compliance with customs/border requirements according to this disclosure.
Figure 9:
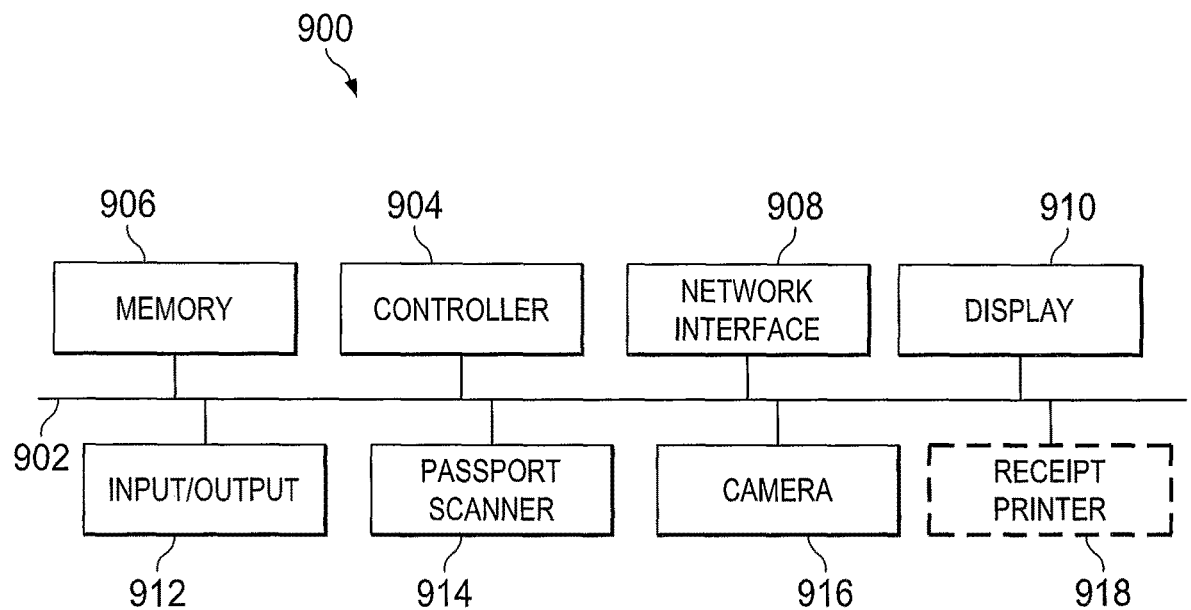
Figure 10:
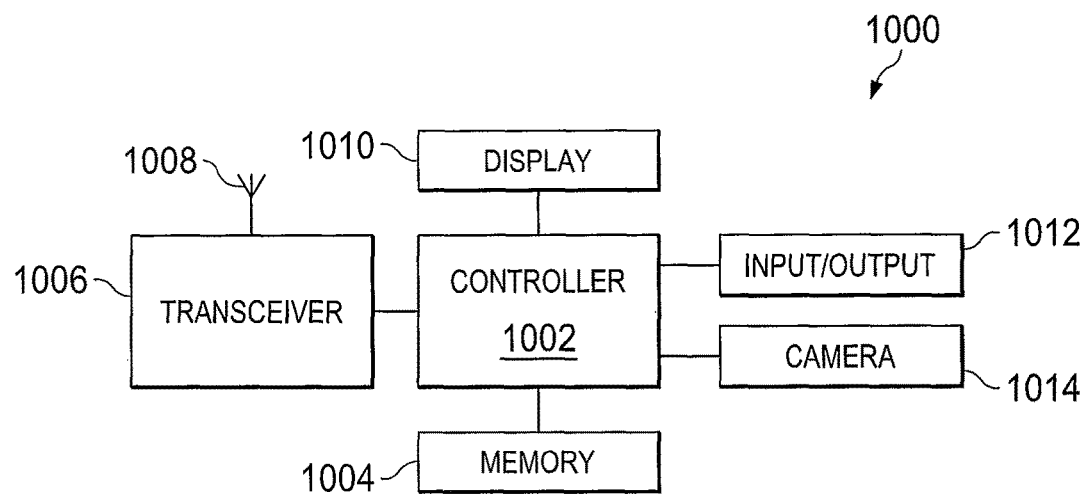

FIGS. 8 through 10 illustrate example kiosks and portable devices supporting compliance with customs/border requirements according to this disclosure. In particular, FIG. 8 illustrates an example form factor for a kiosk, FIG. 9 illustrates example components of a kiosk, and FIG. 10 illustrates example components of a portable device. The portable device could represent a mobile device used by a traveler to submit information for customs/border enforcement purposes. The portable device could also represent a device used by customs/border enforcement personnel, such as to review information about travelers. The kiosks and portable devices could be used in any of the systems described above.

As shown in FIG. 8, a kiosk 800 includes a housing 802, which generally denotes any suitable structure that contains or carries other components of the kiosk 800. The housing 802 could have any suitable size, shape, and dimensions and be formed from any suitable material(s) (such as metal). A display screen 804 is mounted in or to the housing 802 and is used to provide information to travelers. For instance, the display screen 804 could present a welcome screen to a traveler, give instructions to the traveler, and display questions to the traveler. If implemented as a touchscreen, the display screen 804 could also receive input from the traveler, such as an identification of how many people are in the traveler's group and answers to any displayed questions.

A slot 806 denotes an area where travelers can insert their passports (or portions of their passports) or other travel documents for scanning by the kiosk 806. A window 808 allows at least one camera within the kiosk 800 to capture images of travelers. A slot 810 denotes an area where documents (such as printed receipts) may optionally be provided to travelers. An area 812 of the kiosk 800 denotes space where a keypad or keyboard could be installed. The keypad or keyboard could support any suitable functions and support compliance with various regulations, such as the Americans with Disabilities Act. Note that the positioning of the area 812 in FIG. 8 is for illustration only and that the keypad or keyboard could be located elsewhere. An additional scanner 814 could be used for various purposes, such as to scan travelers' fingerprints or perform other functions.

The display screen 804 can be used to present a graphical user interface to travelers. The graphical user interface could be used to interact with, collect information from, and provide information to travelers. For example, the graphical user interface could initially display a welcome screen and allow a traveler to select a language (a kiosk could support any number of languages). The welcome screen can also show part of a disclaimer, and a user could use navigation buttons or touch inputs to review the disclaimer. The disclaimer could, for instance, identify who can use the kiosk and indicate that information must be accurate and will be transmitted to a government agency for review.

Once a language is selected, a traveler can indicate whether he or she is traveling alone or with a family. If the traveler indicates he or she is traveling alone, the graphical user interface prompts the traveler to scan his or her passport. Once scanned, the graphical user interface displays information based on the scanned passport (such as name, date of birth, gender, passport issuing country, and passport expiration date) and asks the traveler to take his or her picture. The traveler can position himself or herself in front of the kiosk's camera and depress a "Take Photo" button. Once a photograph of the traveler is captured, the graphical user interface presents the captured photograph and the information retrieved from the traveler's passport. If the traveler indicates that the information is not correct, the traveler can be prompted to rescan his or her passport. If the traveler indicates that the information is correct, the graphical user interface asks the traveler various questions related to common customs/border declarations. Once the traveler answers all questions, the traveler is asked to confirm the declarations answers. If the traveler confirms the declarations answers, the traveler is asked to confirm his or her travel information (such as departure city, arrival city, and flight number). The flight information could be retrieved from an airline database or in any other suitable manner. If the traveler indicates that the travel information is not correct, the traveler can select an airline and a flight. After the traveler indicates that the travel information is correct or after the traveler has selected an airline and flight, a receipt can optionally be printed for the traveler, and the traveler is directed to a customs/border enforcement officer.

If the traveler indicates that he or she is traveling with a family, the graphical user interface asks the traveler to identify how many people are in the traveler's family. Assume for this example the traveler indicates that three people are traveling in a family. The first traveler is prompted to scan his or her passport, take a photograph, and confirm the first traveler's information. Once confirmed, the second traveler is prompted to scan his or her passport and confirm the second traveler's information. Once confirmed, the third traveler is prompted to scan his or her passport, take a photograph, and confirm the third traveler's information. Note that no photograph of a child may be required during this process. The travelers are then given the option to confirm that no other family members are traveling in the group. Once all travelers have been processed, declaration questions are presented to the travelers, and answers to the questions are received and confirmed. The travelers' flight information is also confirmed. Finally, the receipts for multiple travelers can optionally be printed, and the travelers can be directed to a customs/border enforcement officer.

If at any time a traveler cancels his or her session on a kiosk, a termination screen can be presented to the traveler. If a traveler is unable to properly scan his or her passport, the traveler can be directed to a specific location on a map. The map can be customized for a particular airport or other location.

Note that a subset of these screens could be presented to a traveler using a mobile device. For example, the mobile device could be used to indicate whether a traveler is traveling alone or with a family, scan the passport(s) of the traveler(s), take a photograph of each traveler, obtain answers to declaration questions, and confirm flight information (or any subset of these functions). The display screen on a kiosk could then be modified to skip certain screens, such as skipping steps asking for the same information once the information from the mobile device has been obtained. Also note that the graphical user interface described above is for illustration only, and a wide variety of changes to both the content and layout of the graphical user interface could be made.

As shown in FIG. 9, a kiosk 900 includes at least one bus system 902, which supports communication between other components of the kiosk 900. The bus system 902 includes any suitable communication links. At least one processing device 904 executes instructions that may be loaded into at least one memory 906. The processing device 904 may include any suitable number(s) and type(s) of processors or other devices in any suitable arrangement. Example types of processing devices 904 include microprocessors, microcontrollers, digital signal processors, field programmable gate arrays, application specific integrated circuits, discrete circuitry, or other processing or control device(s). The memory 906 includes any structure(s) capable of storing and facilitating retrieval of information (such as data, program code, and/or other suitable information on a temporary or permanent basis). The memory 906 could include random access memory, read only memory, Flash memory, a hard drive, an optical disc, or any other or additional volatile or non-volatile storage device(s).

At least one network interface 908 supports communications between the kiosk 900 and other systems or devices. For example, the network interface 908 could include a network interface card or a wireless transceiver. The network interface 908 may support communications through any suitable physical or wireless communication link(s).

A display 910 and at least one input/output unit 912 facilitate interaction with a traveler. For example, the display 910 could present information collected from a traveler or other source(s) for confirmation or questions being asked to the traveler. The display 910 (if implemented as a touchscreen) or the input/output unit 912 (such as a keyboard or keypad) could also receive inputs from a traveler, such as answers to questions displayed to the traveler. The display 910 represents any suitable display device, such as a liquid crystal display (LCD) or light emitting diode (LED) display device. Each input/output unit 912 represents any suitable structure for receiving user input or providing user output.

The kiosk 900 further includes a passport scanner 914 and a camera 916. The passport scanner 914 represents a device that can optically or otherwise scan a traveler's passport to read a barcode, QR code, text, or other information on the traveler's passport. Any suitable mechanism can be used to scan a passport, such as a laser scanner or a camera. The passport scanner 914 could also use RFID signals from passports to retrieve information from the passports. In addition, some passport scanners are capable of detecting modified or fraudulent passports, such as by verifying holographic images or detecting a passport photograph placed on top of an original passport photograph.

The camera 916 is used to capture an image of a traveler. For example, during the data collection process, the kiosk 900 (via the display 910) can inform a traveler that he or she needs to take a photograph, such as for inclusion on a receipt to be printed for the traveler or for other purposes. The camera 916 can display a live image on the display 910 so that the traveler can position himself or herself appropriately, and the display 910 or input/output unit 912 can be used to trigger an image capture by the camera 916. The camera 916 represents any suitable image capture device, such as a digital camera.

A printer 918 could optionally be used to print receipts or other documentation for travelers. For example, once the desired information, declarations, and image of a traveler have been obtained, this information could be printed on a receipt or other document using the printer 918. The receipt or other document could then be taken by the traveler to a customs/border enforcement officer. This can greatly simplify the customs/border process and allow faster passage through a customs/border checkpoint. However, as noted above, the kiosk 900 could support a paperless process, which could simplify the customs/border process even further.

FIG. 10 illustrates an example mobile device 1000 that can be used by a traveler or by customs/border enforcement personnel. The mobile device 1000 could, for example, be used as the mobile devices 120a-120b, 124, 320 described above.

As shown in FIG. 10, the mobile device 1000 includes a controller 1002. The controller 1002 controls the overall operation of the mobile device 1000. For example, in a traveler's device, the controller 1002 can receive data associated with the traveler and provide the data to one or more other components in the mobile device 1000 for transmission. In a customs/border personnel's device, the controller 1002 can receive data associated with a traveler and present that information to the customs/border personnel for use in verifying a traveler's identify and assisting in final disposition of the traveler. Note that if only the customs/border personnel are viewing the mobile device 1000, confidential or other information that is not normally printed on a traveler's receipt could be displayed to the customs/border personnel. The controller 1002 could also perform other functions, such as handling incoming or outgoing telephone calls, text messages, web browsing, or other functions. The controller 1002 includes any suitable structure for controlling the operation of the mobile device 1000. As particular examples, the controller 1002 could represent at least one microprocessor, microcontroller, digital signal processor, field programmable gate array, application specific integrated circuit, discrete circuitry, or other processing or control device(s).

A memory 1004 is coupled to the controller 1002. The memory 1004 stores any of a wide variety of information used, collected, or generated by the mobile device 1000. For example, the memory 1004 could store traveler data to be transmitted to external components or data received from external components. The memory 1004 includes any suitable volatile and/or non-volatile storage and retrieval device(s).

The mobile device 1000 also includes one or more wireless transceivers 1006 coupled to one or more antennas 1008. The transceiver(s) 1006 and antenna(s) 1008 can be used by the mobile device 1000 to communicate wirelessly with other devices or systems. For example, the mobile device 1000 could use the transceiver(s) 1006 and antenna(s) 1008 to communicate over cellular telephone networks, WiFi networks, and BLUETOOTH connections. Each transceiver 1006 includes any suitable structure for generating signals to be transmitted wirelessly and/or receiving signals received wirelessly. In some embodiments, each transceiver 1006 represents an RF transceiver. Each transceiver 1006 could also include a transmitter and a separate receiver. In some embodiments, each antenna 1008 could represent an RF antenna (although any other suitable wireless signals could be used to communicate).

The mobile device 1000 further includes a display 1010 and at least one input/output unit 1012. The display 1010 can be used to provide information to a traveler or customs/border personnel and optionally receive input from the traveler or customs/border personnel (when implemented as a touchscreen). The input/output unit 1012 is used to provide information to or receive information from the traveler or customs/border personnel.

In addition, the mobile device 1000 could include a camera 1014. The camera 1014 could be used to capture images associated with a traveler. For example, in a traveler's device, the camera 1014 could be used to capture one or more images of the traveler or the traveler's passport. In a customs/border personnel's device, the camera 1014 could be used to capture images of travelers or travelers' passports for travelers who are interacting with the customs/border personnel. Note, however, that the use of a camera 1014 in the traveler's device may not be permitted or required, such as when security regulations or other requirements specify that a traveler's passport needs to be scanned or the traveler's photograph or biometric data needs to be captured at a kiosk.

The mobile device 1000 could provide any other suitable functionality as needed or desired. For example, the mobile device 1000 of a traveler could support a concierge service associated with an airport or other travel location. As a particular example, after a traveler has provided various customs-related information to an app and exited an aircraft, a concierge app on the mobile device 1000 could direct the traveler to a baggage pickup area or customs/border checkpoint. The concierge app could also inform the traveler of the current wait time at a customs/border checkpoint. If the wait time is excessive (such as longer than a user-defined or other threshold), the concierge app could provide the traveler with a list of options. For instance, the concierge app could identify nearby restaurants within an airport terminal that are accessible without going through a customs/border checkpoint. The concierge app could also determine whether the traveler has a reservation for vehicle transportation (such as a car service) and ask whether the reservation should be delayed until the traveler can clear the customs/border checkpoint. The concierge app could provide any other or additional functionality that could be useful to a traveler.

Although FIGS. 8 through 10 illustrate examples of kiosks and portable devices supporting compliance with customs/border requirements, various changes may be made to FIGS. 8 through 10. For example, the functional divisions shown in FIGS. 8 through 10 are for illustration only. Various components in each figure could be combined, further subdivided, or omitted and additional components could be added according to particular needs.

Figure 11A:
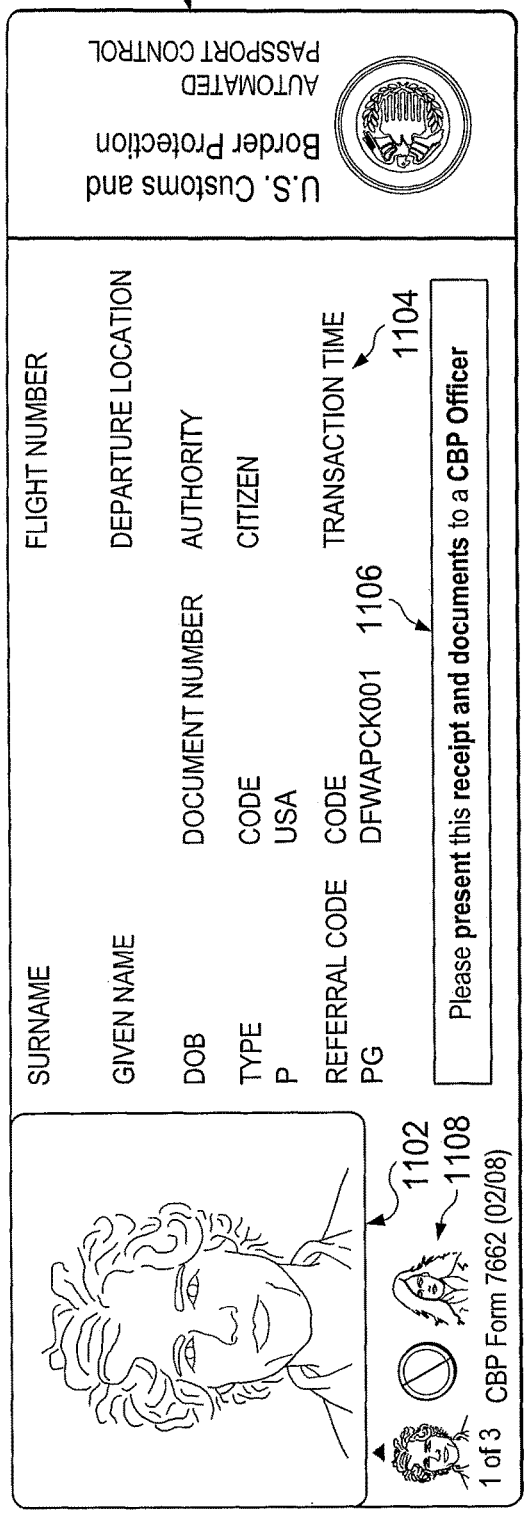
FIGS. 11A and 11B illustrate example printed receipts or graphical displays supporting compliance with customs/border requirements according to this disclosure.
Figure 11B:
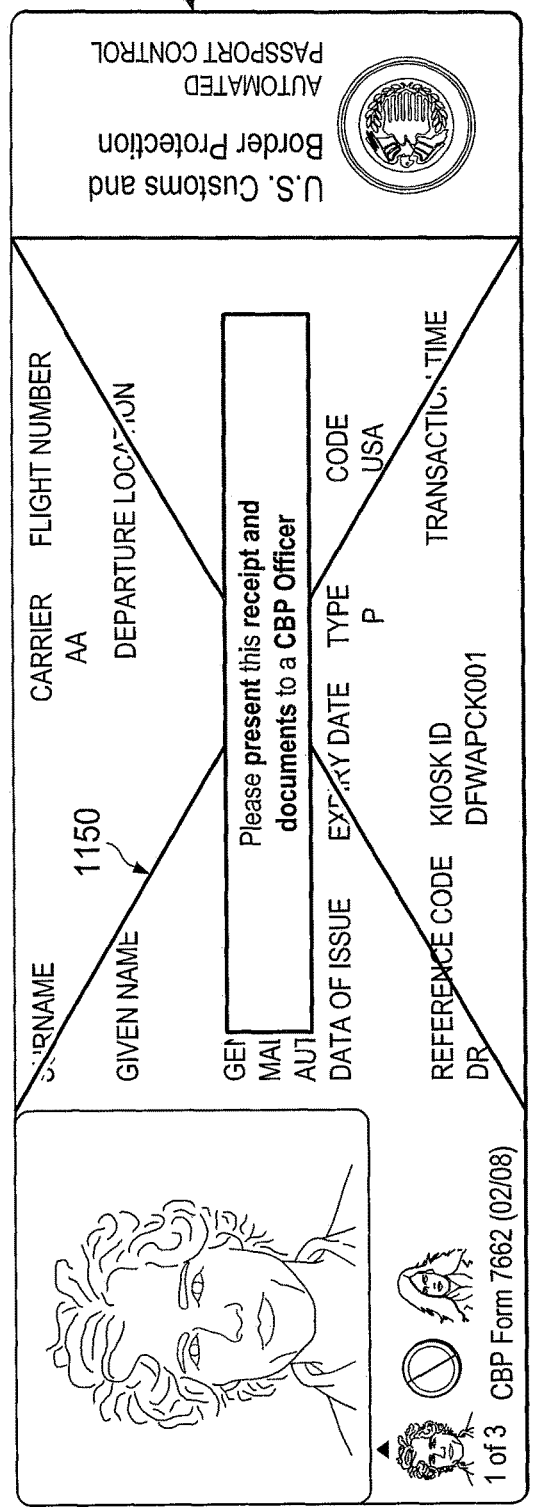

FIGS. 11A and 11B illustrate example printed receipts or graphical displays supporting compliance with customs/border requirements according to this disclosure. The printed receipts could be created by kiosks based on information provided to the kiosks by various travelers. The graphical displays could be presented on devices used by customs/border enforcement personnel when travelers have approached or are approaching the customs/border personnel. As noted above, the presentation of a graphical display could be automated based on, for example, a scan of a traveler's passport or facial recognition.

As shown in FIG. 11A, a receipt or graphical display 1100 includes a photograph 1102 of a traveler. The traveler could be a person traveling alone or one of the adults traveling in a family unit. Information 1104 about that traveler is also presented, and (if provided to a traveler) instructions 1106 are given as to how the traveler should proceed. If the traveler is part of a family unit, two or more thumbnail images 1108 can be provided that identify the people in the family unit. Actual images of children in a family unit could be omitted from the thumbnail images 1108 for security or privacy purposes.

In this example, the information 1104 about the traveler includes name, date of birth, flight information, and citizenship information. The information 1104 also includes a referral code, which informs customs/border enforcement personnel how to handle the traveler. Example referral codes could include:

Enforcement Referral (ER)—an individual is referred to secondary processing for any type of enforcement issue;
Random Referral (RR)—an individual is referred to secondary processing for random inspection;
Declaration Referral (DR)—an individual or family is referred to secondary processing due to at least one answer on a declaration;
Technical Referral (TR)—an individual or family is referred to secondary processing due to a technical processing error at a kiosk or during a lockout period when the kiosk cannot be used;
Biometric Failure (BF)—an individual or family is referred to secondary processing due to an error collecting biometric information at a kiosk;
Entry Authorization (EA)—an individual or family is referred to secondary processing due to a lack of an approved Electronic System for Travel Authorization (ESTA) entry on file; and
Passage Granted (PG)—an individual is free to pass.

If a referral to secondary processing is needed, an indicator 1150 can be placed on the receipt or graphical display 1100. In this example, the indicator 1150 represents a large "X" placed across the receipt or graphical display 1100. However, any other suitable indicator could be used to identify whether secondary processing is needed. Alternatively, no indicator 1150 is provided, and customs/border enforcement personnel could use the referral code or other information to refer travelers to secondary processing.

Although FIGS. 11A and 11B illustrate examples of printed receipts or graphical displays supporting compliance with customs/border requirements, various changes may be made to FIGS. 11A and 11B. For example, the content and arrangement of receipts and graphical displays can vary widely depending on particular needs.

Figure 12A:
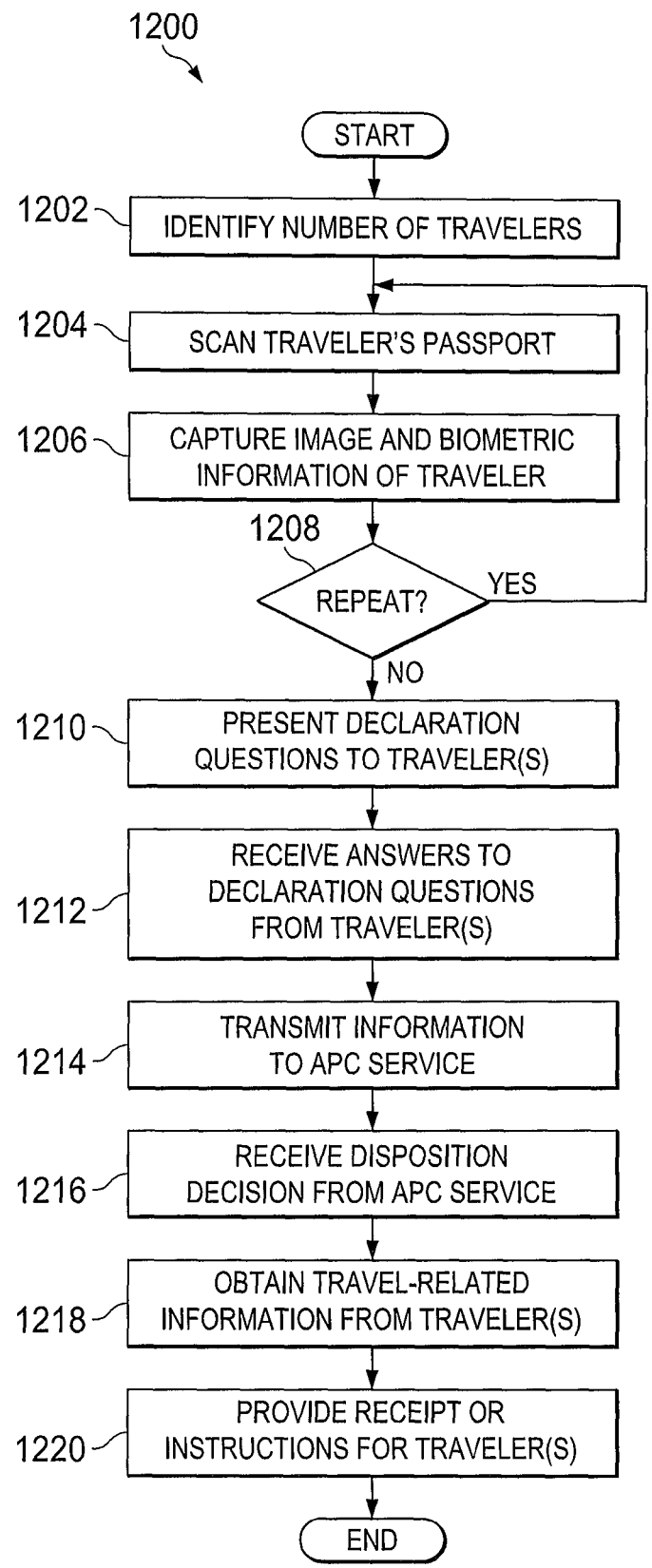
FIGS. 12A and 12B illustrate example methods for supporting compliance with customs/border requirements according to this disclosure.
Figure 12B:
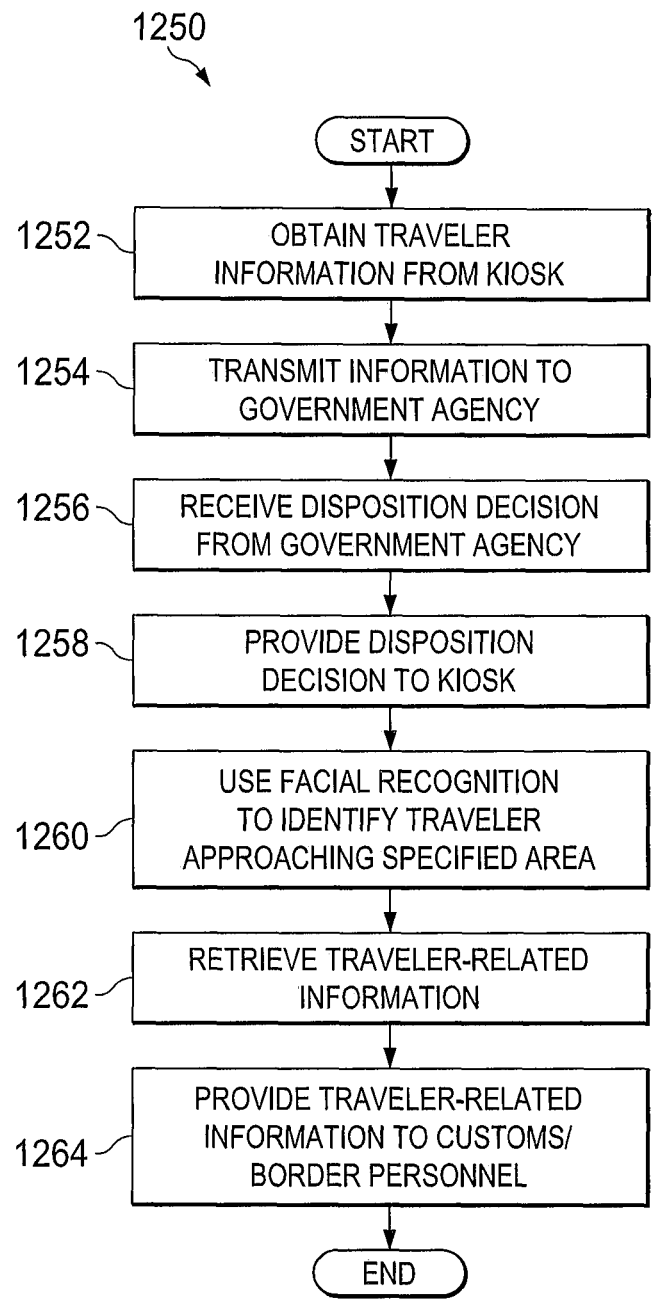

FIGS. 12A and 12B illustrate example methods for supporting compliance with customs/border requirements according to this disclosure. In particular, FIG. 12A illustrates an example method 1200 that could be used by a kiosk that interacts with an APC service, and FIG. 12B illustrates an example method 1250 that could be used by an APC service that interacts with a kiosk.

As shown in FIG. 12A, a number of travelers is identified at step 1202. This could include, for example, a kiosk asking a traveler how many people are in the traveler's party. The traveler could select a "1" to indicate the traveler is alone or a value greater than one to indicate the traveler is in a group.

A first passport scan occurs at step 1204. This could include, for example, the kiosk scanning the passport of the sole traveler or the first traveler in the group. The passport scan could occur in any suitable manner, such as by using MRZ or RFID scans. Note that manual entry of information about the traveler's passport could also occur. A photo of the traveler is captured at step 1206. This could include, for example, the kiosk triggering a camera in the kiosk. The traveler here could be asked to stand at a specified location or otherwise take steps to ensure that the captured image complies with various requirements. Biometric information can also be captured, such as when the kiosk digitally captures fingerprints from certain fingers of the traveler or a retinal scan of one or more eyes of the traveler.

A determination is made whether any remaining travelers need to be processed at step 1208. This could include, for example, the kiosk determining whether the specified number of travelers in the group has been processed. If not, the method 1200 returns to step 1204 to scan another traveler's passport.

The kiosk presents various declaration questions to the traveler(s) at step 1210. This could include, for example, the kiosk displaying questions about currency or monetary instruments and "duty free" exemptions, questions about imports, and questions about whether the traveler had close contact with livestock or other animals while outside the country. Answers to the questions are obtained at step 1212. This could include, for example, the kiosk obtaining touch inputs identifying the traveler's answer to each of the declaration questions.

Information is transmitted to an APC service at step 1214. This could include, for example, the kiosk transmitting the passport information, photos, biometric data, and declaration answers to an application server, which can forward the information to a CBP or other government agency. A disposition decision from the APC service is obtained at step 1216. This could include, for example, the kiosk receiving an indication whether the traveler(s) can proceed to egress or if secondary processing is needed. The indication is based on information from the CBP or other government agency.

Travel-related information is obtained from the traveler(s) at step 1218. This could include, for example, the kiosk obtaining arrival and departure cities, flight information, or other travel-related information from the traveler(s). A receipt or instructions are provided to the traveler at step 1220. This could include, for example, the kiosk generating a printed receipt or displaying instructions to proceed to baggage claim or an egress point.

As shown in FIG. 12B, traveler information is obtained from a kiosk at step 1252. This could include, for example, an application server obtaining passport information, photos, biometric data, and declaration answers from a kiosk. The information is transmitted to a government agency at step 1254. This could include, for example, the application server transmitting the information to a CBP system or other system that can check for criminal, terrorist, or other issues with respect to a traveler. A disposition decision is received from the government agency at step 1256 and provided to the kiosk at step 1258. The disposition decision indicates whether the traveler is free to proceed to egress or if secondary processing is needed for the traveler as determined by the CBP system or other system.

Assuming the traveler proceeds from the kiosk to another area, facial recognition is used to identify the traveler at step 1260. This could include, for example, the application server using images from security cameras, cameras in portable devices used by customs/border personnel, or other cameras to identify when the traveler approaches customs/border personnel in a given area (such as an egress area or a secondary processing area). In response to identifying the traveler, traveler-related information is retrieved at step 1262 and provided to customs/border personnel at step 1264. This could include, for example, the application server retrieving the same information previously provided by the kiosk and stored in a database. This could also include the application server retrieving information obtained from the government agency and stored in a database. In this way, the customs/border personnel are able to obtain and view information about the traveler when the traveler is attempting to exit a location or is undergoing secondary processing. Note that the use of facial recognition is optional here and that manual passport scans, retinal scans, fingerprint scans, or other mechanism(s) could be used to identify a traveler and provide the traveler's information to customs/border personnel.

Note that at any point during these processes, the traveler(s) could be instructed to proceed to secondary processing. For example, if a traveler's passport cannot be scanned, alterations are detected to a passport, or a fraudulent passport is detected, the traveler could be instructed to proceed to secondary processing. As another example, if a traveler is determined to be ineligible to proceed to egress without secondary processing, the kiosk could obtain information from the traveler and then instruct the traveler to proceed to secondary processing without waiting for a disposition decision. As yet another example, some passports include integrated circuit chips that include one or more photographs of the person to whom the passport is issued, and that information could be retrieved by a kiosk. Facial recognition can be used to determine whether the traveler attempting to secure passage through a customs/border checkpoint is the same person to whom the traveler's passport, and if not the traveler could be instructed to proceed to secondary processing without waiting for a disposition decision.

Although FIGS. 12A and 12B illustrate examples of methods for supporting compliance with customs/border requirements, various changes may be made to FIGS. 12A and 12B. For example, while shown as a series of steps, the steps in each figure could overlap, occur in parallel, occur in a different order, or occur any number of times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
 a kiosk disposed at a first airport, the kiosk comprising a passport scanner configured to retrieve passport information from a passport of a traveler, a camera configured to capture a first image of the traveler, and a touchscreen configured to obtain second information associated with the traveler, the kiosk configured to collect, from a mobile device associated with the traveler over a wireless communication link, third information associated with the traveler, wherein the third information comprises customs declaration information previously input by the traveler at the mobile device;

a second camera disposed at a customs or border enforcement area of the first airport, the second camera configured to obtain a second image of the traveler approaching or within a specified portion of the customs or border enforcement area; and at least one computing device disposed at the first airport, the at least one computing device configured to receive the passport information, the first image, the second information, and the third information from the kiosk, receive fourth information associated with the traveler obtained from a second kiosk located at a second airport, provide at least a portion of the received information to an external customs related computer system, and receive a disposition code from the external customs related computer system, wherein the disposition code identifies whether the traveler is allowed to pass the customs or border enforcement area, wherein the external customs related computer system is communicatively separated from the at least one computing device by a firewall;

wherein the at least one computing device is also configured to detect questionable or fraudulent information among the received information and send an alert to an agent associated with the customs or border enforcement area without providing any information to the external customs related computer system; and wherein the at least one computing device is also configured to receive the first or second image, perform facial recognition to identify the traveler, and provide at least some of the received information to the agent associated with the customs or border enforcement area.

2. The system of claim 1, wherein the third information associated with the traveler further comprises:
   a departure location for the traveler;
   an arrival location for the traveler; and
   flight information associated with the traveler.

3. The system of claim 1, wherein the customs declaration information further comprises answers to customs declaration questions from the traveler.

4. The system of claim 1, wherein the second camera is configured to obtain the second image of the traveler approaching or within an egress area of the customs or border enforcement area or a secondary processing area of the customs or border enforcement area.

5. The system of claim 1, wherein the at least one computing device is configured provide at least some of the received information to a display device used by the agent associated with the customs or border enforcement area.

6. A method comprising:
   receiving, at a kiosk disposed at a first airport, first information associated with a traveler from a mobile device associated with the traveler over a wireless communication link, wherein the first information comprises customs declaration information previously input by the traveler at the mobile device;
   retrieving, at a passport scanner disposed at the kiosk, passport information of the traveler;
   capturing, at a camera disposed at the kiosk, a first image of the traveler;
   obtaining, at a touchscreen disposed at the kiosk, second information associated with the traveler;
   obtaining, at a second camera disposed at a customs or border enforcement area of the first airport, a second image of the traveler approaching or within a specified portion of the customs or border enforcement area;
   receiving, at at least one computing device disposed at the first airport, the passport information, the first image, the first information, and the second information from the kiosk;
   receiving, at the at least one computing device, third information associated with the traveler obtained from a second kiosk located at a second airport;
   providing, by the at least one computing device, at least a portion of the received information to an external customs related computer system and receiving a disposition code from the external customs related computer system, wherein the disposition code identifies whether the traveler is allowed to pass the customs or border enforcement area, wherein the external customs related computer system is communicatively separated from the at least one computing device by a firewall;
   detecting, at the at least one computing device, questionable or fraudulent information among the received information and sending an alert to an agent associated with the customs or border enforcement area without providing any information to the external customs related computer system; and
   performing, by the at least one computing device, facial recognition using the first or second image to identify the traveler and providing at least some of the received information to the agent associated with the customs or border enforcement area.

7. The method of claim 6, wherein the first information associated with the traveler further comprises:
   a departure location for the traveler;
   an arrival location for the traveler; and
   flight information associated with the traveler.

8. The method of claim 6, wherein the customs declaration information further comprises answers to customs declaration questions.

9. The method of claim 6, wherein the second image of the traveler comprises an image of the traveler approaching or within an egress area of the customs or border enforcement area or a secondary processing area of the customs or border enforcement area.

10. The method of claim 6, wherein at least some of the received information is provided to a display device used by the agent associated with the customs or border enforcement area.

11. The method of claim 6, wherein the customs declaration information further comprises biometric data of the traveler.

12. The method of claim 6, further comprising:
    printing a document containing at least some of the information for use by the traveler when passing through the customs or border enforcement area.

13. A non-transitory computer readable medium embodying a computer program, the computer program comprising computer readable program code for:
    receiving, at a kiosk disposed at a first airport, first information associated with a traveler from a mobile device associated with the traveler over a wireless communication link, wherein the first information comprises customs declaration information previously input by the traveler at the mobile device;
    retrieving, at a passport scanner disposed at the kiosk, passport information of the traveler;
    capturing, at a camera disposed at the kiosk, a first image of the traveler;
    obtaining, at a touchscreen disposed at the kiosk, second information associated with the traveler;

obtaining, at a second camera disposed at a customs or border enforcement area of the first airport, a second image of the traveler approaching or within a specified portion of the customs or border enforcement area;

receiving, at at least one computing device disposed at the first airport, the passport information, the first image, the first information, and the second information from the kiosk;

receiving, at the at least one computing device, third information associated with the traveler obtained from a second kiosk located at a second airport;

providing, by the at least one computing device, at least a portion of the received information to an external customs related computer system and receiving a disposition code from the external customs related computer system, wherein the disposition code identifies whether the traveler is allowed to pass the customs or border enforcement area, wherein the external customs related computer system is communicatively separated from the at least one computing device by a firewall;

detecting, at the at least one computing device, questionable or fraudulent information among the received information and sending an alert to an agent associated with the customs or border enforcement area without providing any information to the external customs related computer system; and performing, by the at least one computing device, facial recognition using the first or second image to identify the traveler and providing at least some of the received information to the agent associated with the customs or border enforcement area.

14. The non-transitory computer readable medium of claim 13, wherein the first information associated with the traveler further comprises:
   a departure location for the traveler;
   an arrival location for the traveler; and
   flight information associated with the traveler.

15. The non-transitory computer readable medium of claim 13, wherein the customs declaration information further comprises answers to customs declaration questions.

16. The non-transitory computer readable medium of claim 13, wherein the second image of the traveler comprises an image of the traveler approaching or within an egress area of the customs or border enforcement area or a secondary processing area of the customs or border enforcement area.

17. The non-transitory computer readable medium of claim 13, wherein at least some of the received information is provided to a display device used by the agent associated with the customs or border enforcement area.

18. The non-transitory computer readable medium of claim 13, wherein the customs declaration information further comprises biometric data of the traveler.

19. The system of claim 1, wherein the third information further comprises information about at least one family member traveling with the traveler.

20. The method of claim 6, wherein the first information further comprises information about at least one family member traveling with the traveler.

* * * * *